Dec. 30, 1941. N. E. BROOKE 2,268,066
RAKE
Filed Sept. 19, 1940 4 Sheets-Sheet 2
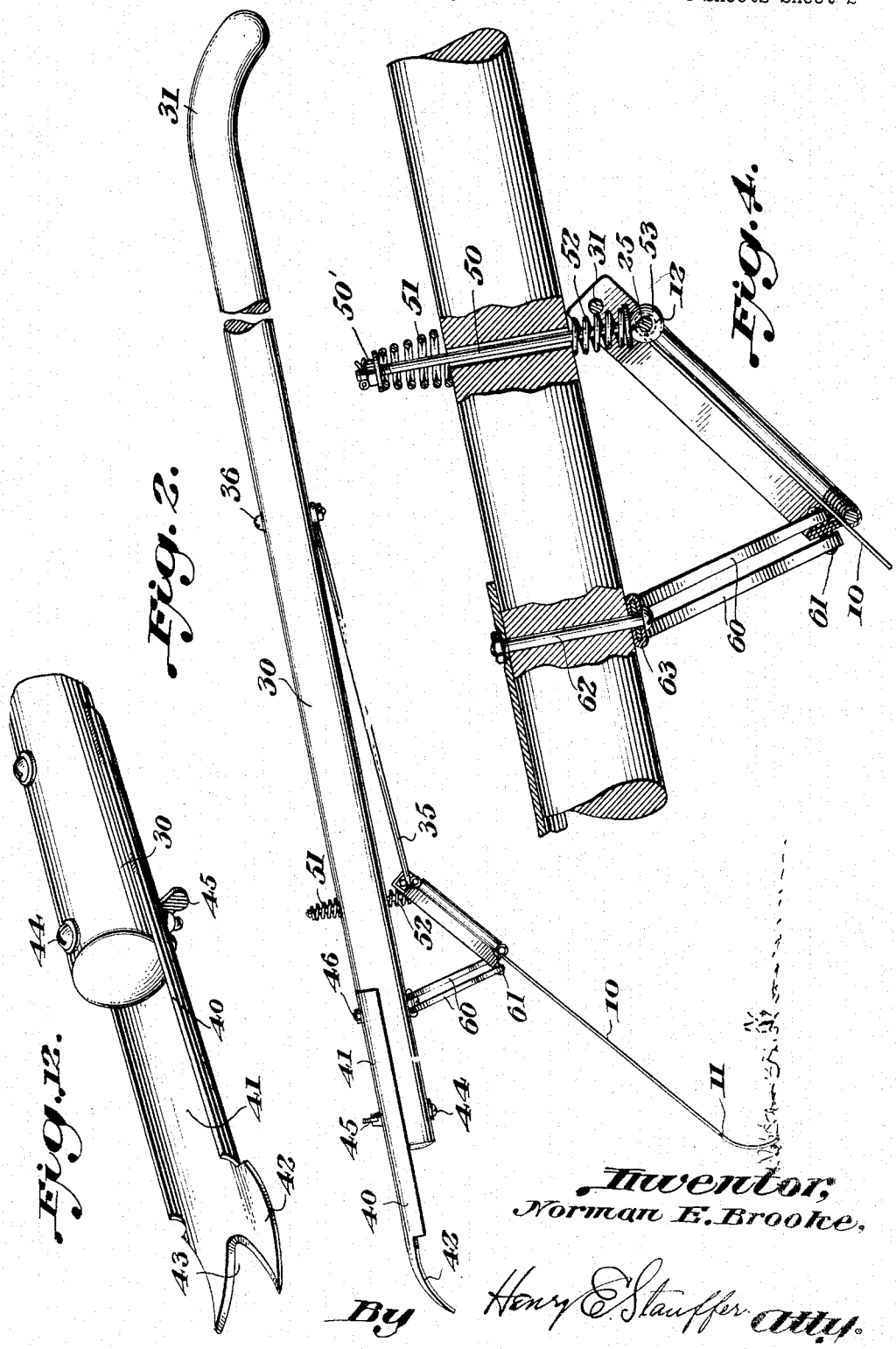
Inventor,
Norman E. Brooke,
By Henry E. Stauffer Atty.

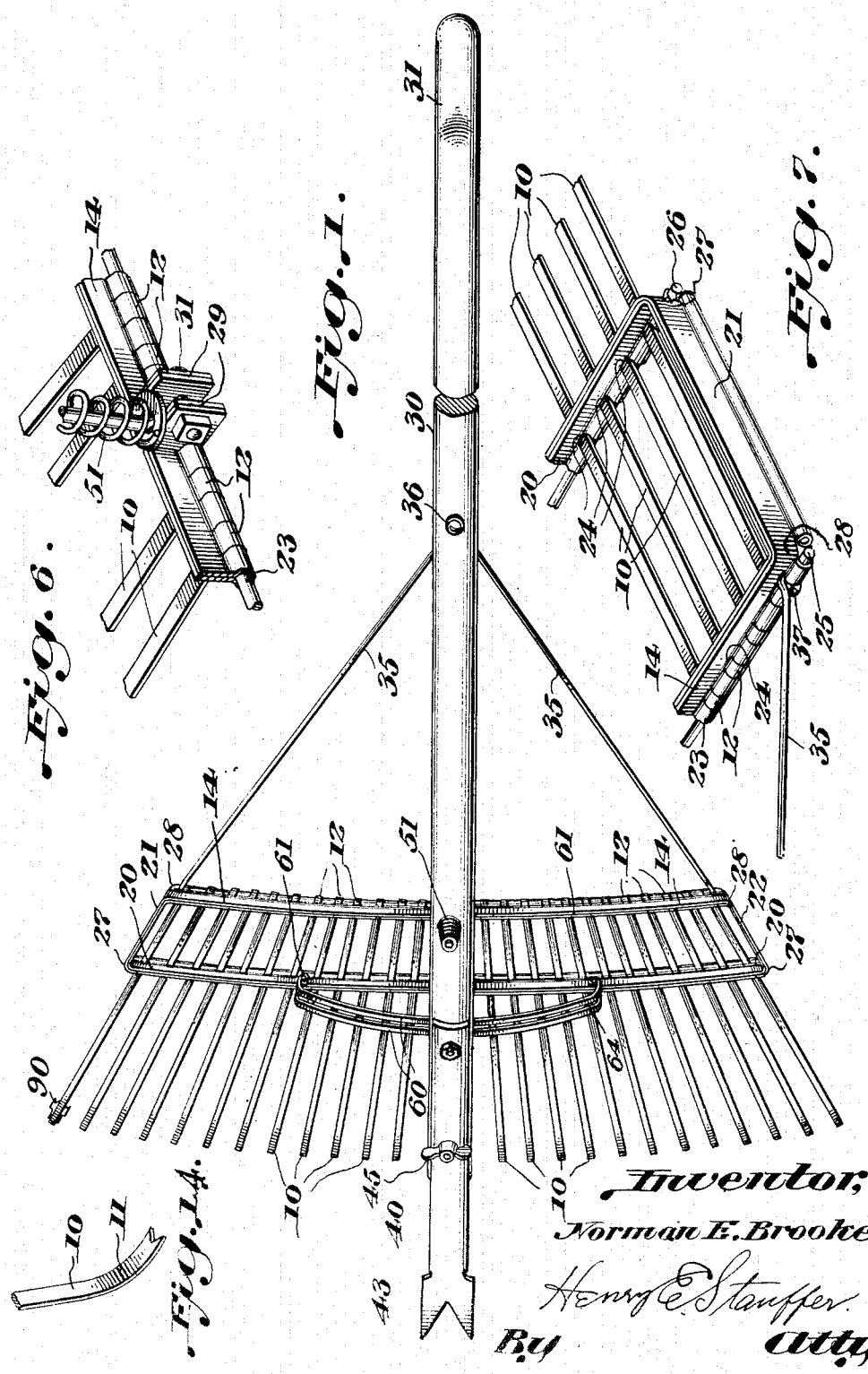

Dec. 30, 1941.  N. E. BROOKE  2,268,066
RAKE
Filed Sept. 19, 1940  4 Sheets-Sheet 3
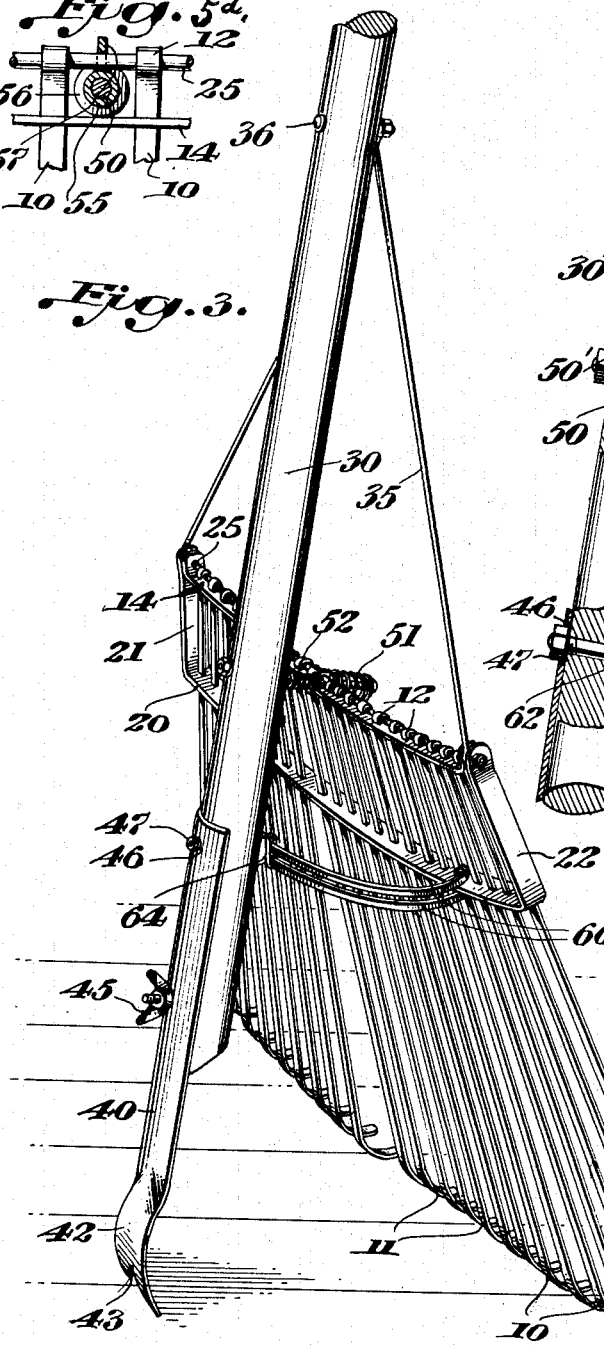
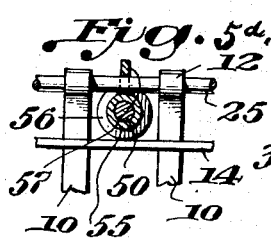
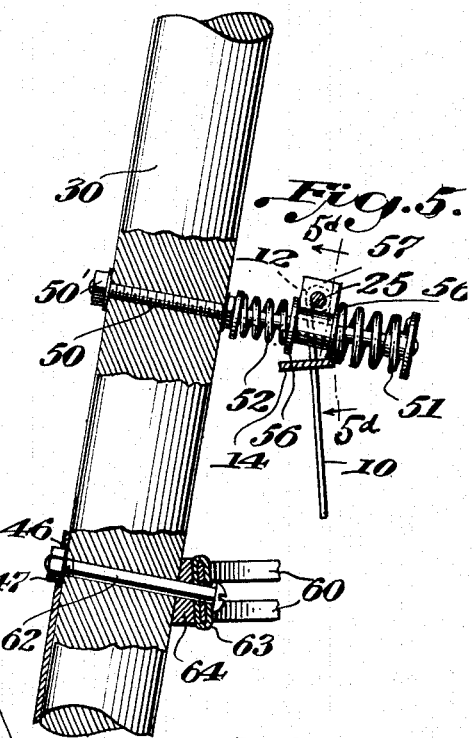
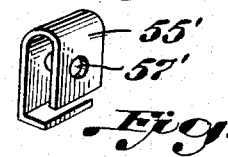
Inventor,
Norman E. Brooke
By Henry E. Stouffer atty.

Dec. 30, 1941.         N. E. BROOKE         2,268,066
RAKE
Filed Sept. 19, 1940         4 Sheets—Sheet 4
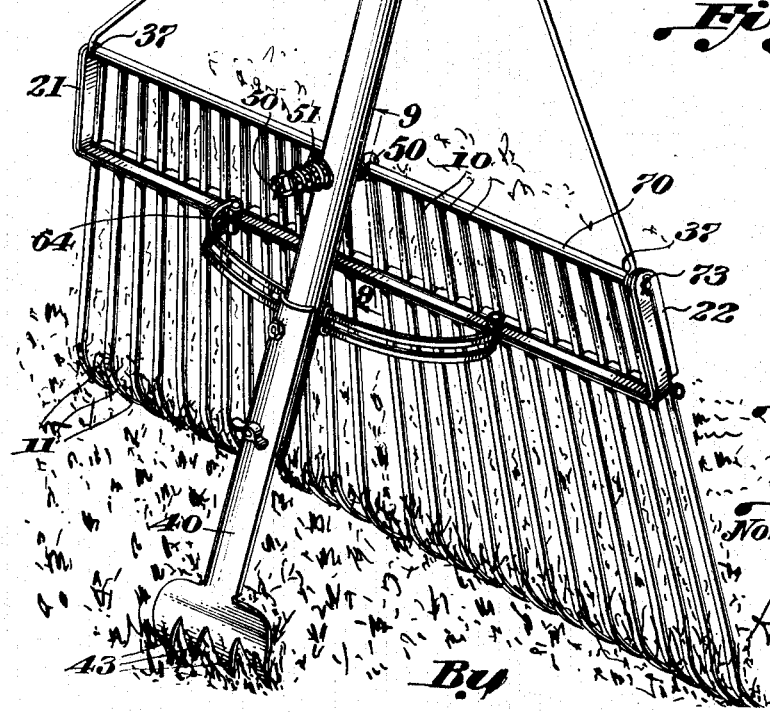

Patented Dec. 30, 1941

2,268,066

UNITED STATES PATENT OFFICE 2,268,066

RAKE

Norman E. Brooke, Washington, D. C.

Application September 19, 1940, Serial No. 357,477

16 Claims. (Cl. 56—400.17)

This invention is in hand rakes of the so-called broom type, and particularly rakes of the general type shown, described and claimed in my United States Patent No. 2,205,827, dated June 25, 1940.

One of the objects of the present invention is to provide a rake of the above mentioned type that will readily maintain itself in an upright position on the turf without extraneous support, with its handle in a substantially vertical position.

A further object is to provide a modified spring means by which the rake head is secured to the handle, whereby the elasticity of the construction shown in my said earlier patent is improved.

A further object is to provide a weed cutter of great strength and rigidity, and one that will cooperate with the other parts of the implement to enable the rake to stand upright upon the turf.

The invention also embodies a novel rake head construction, wherein the rake tines, bridles and other parts may be easily and rapidly assembled, disassembled and repaired.

In the drawings:

Fig. 1 is a top view of one form of my invention, the rake handle being partly broken away;

Fig. 2 is a side view of the rake shown in Fig. 1, showing the angular relationship between the handle and the rake head;

Fig. 3 is a perspective view of the rake standing in upright position on the ends of the tines and the extension of the handle;

Fig. 4 is a fragmentary view, partly in section, of one form of spring mechanism by which the rake head is secured to the handle;

Fig. 5 is a fragmentary view, partly in section, of a slightly different form of spring mechanism by which the rake head is secured to the handle;

Fig. 5a is a detached view of a clip which may be used in connection with the spring mounting shown in Fig. 5;

Fig. 5b is a detached view of a wedge-shaped rest for the transverse springs which support the front bridle of the rake head, the wedge being shown in position in Fig. 5;

Fig. 5c is a detached view of a clip used to secure the transverse springs in proper relation to each other, the clip being shown in position in Figs. 4 and 5;

Fig. 5d is a section on the line 5d—5d of Fig. 5;

Fig. 6 is a fragmentary perspective view of one form of rear bridle and spring construction;

Fig. 7 is a fragmentary perspective view of a different form of bridle construction, with the rake tines mounted therein;

Fig. 8 is a perspective view of a standing rake, with a modified cutter attached thereto;

Fig. 9 is a sectional view taken on the line 9—9 of Fig. 8, showing the manner in which the springs are secured to the rake head;

Fig. 10 is a fragmentary perspective view of a modified bridle arrangement, with certain tines mounted in the bridles;

Fig. 11 is a fragmentary perspective view of a further modified arrangement of bridles and tines;

Fig. 12 is a view of the under side of a cutter arranged on top of the lower end of the rake handle, as an extension thereof;

Fig. 13 is a fragmentary view of the under side of a modified multi-pointed tine; and Fig. 14 is a fragmentary view of the under side of another modified tine.

Referring to the accompanying drawings, wherein like parts are similarly numbered in the several figures, the invention comprises a plurality of spring tines 10 which, together with their supporting bridles, constitute the body portion of the rake; and a handle 30, to which the rake body is secured. The tines are of uniform hardness and elasticity, and are so mounted that breakage due to the character of the material is reduced to a minimum; and, if breakage should occur, replacement of broken tines may be easily and rapidly effected.

As here shown, the handle 30 has its upper end curved at 31, so that this end can be used as a means for turning the rake, if and when desired. This is important, but is not essential.

The number of tines 10 to be employed in any given case is a matter of choice, being dependent upon the size of the rake desired, and somewhat upon the use to which the rake is to be put, since, for some purposes, it may be desirable that the tines be positioned more closely together than for others.

The tines 10 have their front ends bent permanently, as at 11, while their rear ends are formed into eyes 12 (Figs. 4 and 7) by which they are held in place, as will be more fully described hereafter.

A multi-pointed tine of special construction is shown in Fig. 13. This is intended primarily as an outside tine, and is especially adapted to lift out and remove weeds which have been severed and loosened by the cutter. This construction, as here shown, is made as a separate piece 10', which is secured to the tine 10 by a band or clip 11'.

Fig. 14 also is a further modified tine end. The end is here shown notched, so that it likewise may be used as an outside tine, for the purpose of removing extraneous matter from the turf.

Elements known technically as "bridles" support and hold the tines. In the preferred form (Figs. 1 and 7), two such bridles 14 and 20 are used. These bridles may be constructed in any one of many ways, but are here shown as made from one continuous strip of sheet metal. This strip is of a sufficient length to make the two bridles 14 and 20, and the connecting ends 21 and 22 (Figs. 1 and 7). The strip is folded longitudinally (Fig. 6) in such a manner as to form a central bead or cylindrical recess 23. After the bead or recess has been severed where the corners are to be formed, the strip is shaped, as shown in Figs. 1 and 7, to form the two bridles 14 and 20, and the integral ends 21 and 22. The bead or recess 23 of the rear bridle is cut away at various places to form notches 24, to receive the eyes 12 of the tines 10; while the front bridle is cut somewhat more deeply, but at somewhat wider intervals, as at 24, to receive the flat portions of the tines (Fig. 7). A rod or pin 25 is inserted through the bead or recess 23 of the rear bridle 14 and the eyes 12 of the tines; and a similar rod or pin 26 passes through the bead 23 of the forward bridle 20, but beneath the tines 10. Thus, the rear ends of the tines are held pivotally on the rod or pin 25, while their more forward portions are supported in the bridle 20 by the rod or pin 26.

As stated above, the bead 23 is cut where it is to be bent to form the corners 27 and 28 (Fig. 7). The bead is also removed at the free ends 29, 29, of the bridle strip, and these ends are then bent at right angles (Fig. 6), and are adapted to be drawn toward each other by a bolt 31, which is passed therethrough. This not only secures the ends 29, 29, but bows the bridles 14 and 20 and pins 25 and 26, as will be explained hereafter.

A brace 35 extends from the ends of the rear bridle 14 to the handle 30, to which it is secured by a suitable bolt or other convenient fastening means 36. This brace is preferably of steel which has been given a spring temper, so that it will yield readily to blows or pressure, but will not readily buckle or break. This gives lateral stiffness to the rake. The brace is provided with eyes 37, which are passed over the ends of the rod or pin 25 of the rear bridle 14, and thus are held firmly but pivotally in position.

The metal strip for the bridles is folded, as explained above, to provide a bead or cylindrical recess 23; then is bent at points 27 on both sides of the middle part, to form the bridle 20; and then bent again at 28, 28 (Fig. 1), to form the parts 21 and 22 of the bridle structure. After the strip is thus formed into the approximately rectangular frame, the tines 10 are laid therein, with the eyes 12 thereof in the recesses 24 of the rear bridle 14, and the body portions thereof in the recesses 24 of the front bridle. The rod or pin 25 is then inserted in the bead 23 of the rear bridle and through the eyes 12 of the tines; and the rod or pin 26 is inserted in the bead 23 of the front bridle beneath the bodies of the tines. Thus the tines are pivoted at their rear ends and are held securely, but with freedom of movement, in the front bridle. The bolt 31 (Fig. 6) may then be inserted in the ends 29 of the bridle strip, and these ends are drawn together until they approach or even contact each other. This drawing together of the ends 29 tends to curve the whole bridle framework, giving both bridles the curved shape shown in Fig. 1. The distances between the tines where they rest in the front bridle 20 are slightly greater than between the eyes 12 where these eyes rest in the rear bridle, so that the drawing together of the ends 29 spreads out the tines from rear to front, giving them the typical rake appearance. This also causes the rods or pins 25 and 26 to bend in their recesses and in the eyes of the tines, whereby they are held firmly in position so that no other fastening means need necessarily be provided, although some other means may be used if preferred. If the rear rod or pin 25 should project beyond the ends of the bridle, it may be cut off; but if its length is correctly calculated, it may be brought practically to an even surface, and no removal of excess metal is necessary. The bolt 31 which, together with its nut, draws together and secures the ends 29 of the bridle, if too long, may be cut off after the nut is tightened; but here also, if made of proper length, there will be no undue projection.

While the bridles have been described as being curved by the tightening of the bolt 31, other methods of bowing the bridles, and securing their ends will readily suggest themselves, and applicant is not limited to this particular construction.

As in the arrangement shown in my Patent No. 2,205,827, the rake head, that is, the tines 10 and their bridles 14 and 20, are normally positioned at a distinct angle to the plane of the handle. This makes it possible to use the rake as a stiff-backed rake is used, and at the same time provides the tine action of the broom type rake. To secure this angular relation, and at the same time to retain and improve the elasticity of my patented construction, the rake head is attached to the handle by a system of springs which will now be described.

The rear portion of the rake head is supported from the handle 30 by the pin or rod 50 and springs 51 and 52 (Figs. 4 and 5). The pin or rod 50 has an eye 53 (Fig. 4) by which it is attached directly or indirectly to the rear bridle 14. While any suitable connection may be used, as here shown, the rod or pin 25, on which the tines are pivoted, passes through this eye 53, thus supporting the rear bridle from the handle 30.

The pin or rod 50 passes loosely through the handle 30, and carries at its upper end a nut 50'. Between the nut 50', or a washer beneath the same, and the upper side of the rake handle is an open spiral spring 51; and between the eye 53, or a washer on top thereof, and the under side of the handle, is another open spiral spring 52.

This arrangement constitutes a yielding or elastic mounting for this portion of the rake head. As the rake is used, this rear portion tends to compress more or less one or the other of the springs 51 or 52. Downward thrusts on the rear part of the rake, causing nut 50' to move downwardly, will be absorbed by the spring 51, while an upward movement of the rake head will be absorbed by the spring 52.

This arrangement places one of the springs, as 51, above the handle. An equivalent arrangement, but with the corresponding spring below the rake head, is shown in Figs. 3 and 5. With this latter arrangement, the same pin or rod 50 passes through the handle 30, but in this instance it is fixed in the handle. Here the open coiled spring 52 is the same open coiled spring as the element numbered 52 in Fig. 4; and the open coiled spring 51 is the same spring which is so numbered in Fig. 4; but in as much as in this form the pin or rod is fixed to the handle, there must be a relative movement between the pin or rod and the bridle. This may be accomplished in various ways. In the preferred construction, as shown in Fig. 5, a sleeve 55 (Fig. 5d), having washers 56, 56, above and beneath the same, and a side extension 57 with a hole therein, are employed. This sleeve 55 is placed over the pin or rod 50 between the springs 51 and 52, and rod 25 is passed through the hole in the extension 57, so that the sleeve can pivot slightly on this rod. Preferably the hole through the body of the sleeve to accommodate the pin or rod 50 is slightly larger than the diameter of the pin or rod, so that there is room for slight lateral play as the sleeve 55 moves up and down the pin or rod 50 during compression of one or the other of the two springs 51 or 52.

Fig. 5a shows a clip 55' which may be used as a substitute for the sleeve 55 of Fig. 5, the hole 57' being the equivalent of the hole in the part 57 through which the pin or rod 25 is passed. Other and equivalent methods of mounting these springs 51 and 52 will readily suggest themselves.

The front part of the rake head is spring supported in a manner substantially as in my earlier patented construction, except that, as here shown, duplicate or companion flat springs 60, 60, are employed, instead of a single spring. These flat springs are transversely arranged, with their ends secured to the forward bridle 20, by means of bolts or pins 61, 61 (Fig. 1), which pass through eyes in the ends of the springs, and through the body of the bridle. At or about their middle portions, the springs are secured together by a suitable loop or clip 63 (Fig. 5c). A bolt 62 (Fig. 4), which passes through a hole 63' in the clip 63, and through the handle 30, is suitably secured in the handle as by a nut 47. As here illustrated, a wedge 64 is placed between the clip 63 and the handle 30, so that the springs 60, 60, may seat without having a tendency to twist. Any equivalent construction may of course be used.

These springs 60, 60, near the pins by which the ends are attached to the bridle 20, are curved rather sharply, as at 64 (Fig. 1). As explained in my patent referred to, these relatively sharp curves give rigidity at these points, so that the principal spring motion is between the curves 64.

The springs 60, 60, are of such depth or curvature as to hold the bridle 20 normally much farther from the rake handle than the rear bridle 14 is normally held. This provides an acute angular relationship between the plane of the rake head and the plane of the handle. By "plane of the rake head" or equivalent language used herein, is meant the plane of the tines; that is, a plane such as would pass through or engage all of the tines of the rake head throughout the greater part of their length, from the rear bridle to the curved portions 11 thereof.

By "plane of the handle" is meant a plane such as, if passed longitudinally through the center of the handle, would divide the same into equal upper and lower semi-cylinders. In other words, with the tine ends 11 resting upon a flat surface, the handle parallel to that surface, the plane of the handle, as herein referred to, is a horizontal plane.

While the above is the preferred embodiment of my invention, a modified bridle formation is shown in Fig. 3. In this form, the front bridle 20 and the ends 21 and 22 of the bridle structure are made from one flat strip which is perforated to receive the tines. The rear bridle 14 is a separate piece likewise perforated so that the tines may be passed therethrough. The rod 25 is here run through the ends 21 and 22 of the bridle strip, and through the eyes of the tines.

In Fig. 8, the front bridle and the ends 21 and 22 are as in the preferred form above described, but the rear bridle is in the form of a tube 70 (Fig. 10). This tube is cut away on the under side, as at 71, to form recesses into which the eyes 12 of the tines 10 are placed. A pin or rod 72 passes through the tube 70 and the eyes of the tines therein, and through the ends 21 and 22 of the bridle strip. Fasteners, as cotter pins 73, or their equivalents, may be used to hold the parts together.

A further modified bridle arrangement is shown in Fig. 11. Here, the two bridles are made from one piece of material, but are of a somewhat different formation, and a separate supporting rod is used for the rear ends of the tines. A single strip forms the front and rear bridles 80 and 81. The front bridle is provided with tine openings 82, and the rear bridle with notches 83 (Fig. 11). The strip is bent to form the connection between the two bridles, and is further bent upon itself, as at 84, to form seats for the rod 85, which rests therein and in the eyes 12 of the tines 10.

The lower end of the rake handle 30 is shown as extended to a plane which is approximately that of the ends of the tines. The handle carries a cutter 40, bolted or otherwise secured thereto. This cutter has its body concaved, as at 41 (Fig. 12), to fit snugly around the surface of the rake handle. The blade of the cutter is preferably curved as at 42, and notched as at 43. The curvature 42 gives the blade what may be termed a "spoon" shape (Figs. 2 and 12), so that it may be made of thin material, but still have the necessary rigidity. The V-shaped cutting face 43 readily engages the root of the weed or other growth below the surface of the ground. The cutter is intended to be used by turning over the rake and inserting the blade in the turf, so that the V-shaped cutting surface shall sever the objectionable growth below the ground, which growth may then be removed in any convenient way.

The cutter shown in Fig. 8 is wider than that shown in Fig. 1, and is provided with a plurality of cutting notches 43.

The cutter can be held in position on the handle in any preferred manner. As here illustrated, it is secured by a single bolt, as 44, which passes through the lower end of the rake handle and through the body of the cutter. A simple nut, as the wing nut 45, may be used to hold the cutter to the handle. The rear end of the cutter is provided with a larger opening 46 (Figs. 3 and 5), which is passed over nut 47 of the bolt 62, which is used to retain the rake supporting springs 60, 60. The opening 46, resting over the nut 47, prevents displacement of the cutter. This is only one convenient means of mounting the cutter so that it may easily be removed. Other equivalent means will readily suggest themselves.

It will be noticed, particularly by reference to Figs. 2 and 3, that the end of the curved portion 42 of the cutter 40 is of such length with respect to the tines of the rake that the rake may readily be made to stand in an upright position by resting the same on the cutter and the tines, as shown best in Fig. 3. This depends also, of course, on the angular relationship between rake head and handle. While the size of the angle may vary considerably, it must be such that when the end of the cutter and the ends of the tines are in approximately a horizontal plane, the center of gravity of the rake will fall between them. The ability of the rake to stand is a great convenience, and is an important feature of my invention, as it avoids the necessity of laying the implement flat upon the ground, or finding a support against which it may be rested.

I claim:

1. In a rake, the combination of a handle member, a head member positioned alongside of the handle member, spring means connecting the forward part of the head member to the handle member, and means connecting the rear part of the head member to the handle member including a pin secured to one of the said members and passing freely beyond the other member but in operative connection therewith, and open helical springs arranged around said pin, one between the two members, and another between the member beyond which the pin passes and the end of the pin.

2. In a rake, the combination of a handle member, a head member positioned alongside of the handle member, spring means connecting the forward part of the head member to the handle member, a pin secured to the rear part of the head member and passing freely beyond the handle member but in operative engagement therewith, and open helical springs arranged around said pin, one between the two members, and another between the handle member and the end of the pin.

3. In a rake, the combination of a handle member, a head member positioned alongside of the handle member, spring means connecting the forward part of the head member to the handle member, a pin secured to the handle member and passing freely beyond the head member at the rear thereof though engaged therewith, and open helical springs arranged around the said pin, one between the two members and another between the head member and the end of the pin.

4. In a rake, the combination of a handle member, a head member including tines and a front bridle and a rear bridle positioned alongside of the handle member, spring means connecting the front bridle of the head member to the handle member, a pin secured to the handle member and passing freely beyond the rear bridle of the head member though engaged therewith, and open helical springs arranged around said pin, one between the two members, and another between the head member and the end of the pin.

5. In a rake, the combination of a handle member, a head member positioned alongside of the handle member, transverse spring means connecting the forward part of the head member to the handle member, a pin secured to the handle member and passing freely beyond the head member though engaged therewith, a collar freely movable on the pin and pivoted on the head member, and open helical springs arranged around said pin, one between the handle member and the collar and another between the collar and the end of the pin.

6. In a rake, the combination of a handle member, a head member including tines and a tine holding rod positioned alongside of the handle member, transverse spring means connecting the forward part of the head member to the handle member, a pin secured to the handle member and passing freely beyond the head member though engaged therewith, a collar freely movable on the pin and pivoted on the tine holding rod of the head member, and open helical springs arranged around said pin, one between the handle member and the collar and another between the collar and the end of the pin.

7. In a rake head, a plurality of spring tines having their rear ends provided with holding features, a rear bridle and a front bridle in which the tines are mounted, the rear bridle having a tubular bottom with tine notches formed therein to receive the holding features of the tines, a holding rod in the tubular part and in the holding features of the tines, and the front bridle having tine notches therein spaced somewhat farther apart than the notches of the rear bridle, a holding rod therefor, and means for holding the two bridles and their holding rods bent and under tension so as to cause the tines to spread, substantially as described.

8. In a rake head, a plurality of spring tines provided with eyes in their rear ends, a rear bridle and a front bridle by which the tines are mounted, the rear bridle having a tubular edge with tine notches formed therein to receive the eyes of the tines, and a holding rod resting in the tubular edge and in the eyes of the tines, the front bridle having tine notches therein spaced farther apart than the notches of the rear bridle, and means for holding the two bridles and the retaining rod bent and under tension so as to hold the tines spread apart and so that the eyes of the tines will grip and hold the rod.

9. A rake head comprising a plurality of spring tines having eyes in their rear ends, a bridle structure formed of a metal strip comprising a front bridle which has spaced apart notches for the tines and bent at the ends of the front bridle to form converging rearwardly extending end portions, and bent again to form a rear bridle approximately parallel to the front bridle with one end of the strip forming one portion of the rear bridle and the other end forming the other portion thereof, both portions being provided with notches which are closer together than the notches in the front bridle for the eyes on the ends of the tines, a rod carried by the front bridle for holding the tines in the notches thereof, another rod carried by the portions constituting the rear bridle for holding the tines in the notches therein, and means for drawing the ends of the rear bridle more or less closely together, so as to curve the bridles and fan out the spring tines and bend the holding rods and hold them under tension so that they will be retained in position.

10. A rake head comprising a plurality of tines provided with eyes at their rear extremities, and a bridle structure, the bridle structure including a front member with a tubular lower edge and tine engaging notches formed in the lower edge, and a rear member with a tubular lower edge and tine engaging notches formed in the lower edge, the notches in the rear member being less widely spaced than those in the front member, rods one for each of the members and adapted to cooperate with the tubular lower edge thereof by passing therethrough so that the tines will rest upon the rod in the front member and will have their eyes engaged by the rod in the rear member, and means for causing and maintaining a horizontally arcuate distortion in the two said members whereby the tines will be fanned out and at the same time the rods will be secured against displacement.

11. A rake comprising a handle, a rake head disposed alongside of the handle and comprising at least two bridles and spring tines supported thereby, springs connecting the rake head and the handle, and a brace of spring material pivotally secured at its ends to the outer portions of the rear bridle and attached to the handle at a suitable distance from said bridle, so that as the springs which connect the bridles and the handle yield the ends of the brace may pivot on the bridle and the brace yield by reason of its spring characteristic.

12. A rake comprising a handle and a rake head, means for securing the rake head alongside of the handle and near one end thereof with its forward portion farther from the handle than its rearward portion, the angle between the head and handle being such that when the said end of the handle and the forward portion of the head are in an approximately horizontal plane, the center of gravity of the rake will fall between them.

13. A rake comprising a handle and a rake head including tines having ground engaging ends, means for securing the rake head alongside of the handle and near one end thereof with its forward portion farther from the handle than the rearward portion, the angle between the head and handle being such that when the said end of the handle and the ground engaging ends of certain of the tines are in an approximately horizontal plane, the center of gravity of the rake will fall between them.

14. A rake comprising a handle, a cutter secured on the end of the handle and forming an extension thereof, and a rake head including tines having ground engaging ends secured alongside the handle and with the ground engaging ends of the tines extending a distance substantially that of the cutter extension but spaced farther from the said extension than the other ends of the tines are spaced from the handle, the angle between the tines and the handle being such that when the ground engaging ends of the tines and the cutter extension are in an approximately horizontal plane, the center of gravity of the rake will fall between them.

15. A rake comprising a handle, a rake head including tines having ground engaging ends, means for holding the head alongside of the handle with the rear part thereof closer to the handle than the front part, and an extension for the end of the handle projecting substantially to the ground engaging ends of the tines, the angle between the head and handle being such that when the end of the extension and the ground engaging ends of the tines are in an approximately horizontal plane, the center of gravity of the rake will fall between them.

16. A rake having a handle, a rake body including tines having curved lower ends, means for holding the rake body to the handle with the rear part of the body closer to the handle than the front part thereof, and a cutter attached to the handle and forming a continuation thereof and extending substantially to the curved ends of the tines, the angle between the rake body and the handle being such that when the curved ends of the tines and the end of the cutter are in an approximately horizontal plane the center of gravity of the rake will fall between them.

NORMAN E. BROOKE.